H. S. WALTHER AND G. HENCHOZ.
BUTTER MIXER
APPLICATION FILED FEB. 3, 1919.

1,354,230. Patented Sept. 28, 1920.

UNITED STATES PATENT OFFICE.

HENRY S. WALTHER AND GUSTAVE HENCHOZ, OF YVERDON, SWITZERLAND.

BUTTER-MIXER.

1,354,230.

Specification of Letters Patent. Patented Sept. 28, 1920.

Application filed February 3, 1919. Serial No. 274,759.

*To all whom it may concern:*

Be it known that we, HENRY S. WALTHER and GUSTAVE HENCHOZ, citizens of Switzerland, residing at Yverdon, have invented a certain new and useful Butter-Mixer; and we do declare the following to be a full, clear, and exact description of the invention, such as will enable others skilled in the art to which it appertains to make and use the same.

The object of the present invention is a device for the production of alimentary products which require beating or stirring such as butter, mayonnaises, sauces and the like comprising a vessel the contents of which are to be beaten or stirred, extending into said vessel is a paddle attached to a spindle which is driven in any suitable way for instance by a hydraulic motor. Said motor consists of a turbine with vertical spindle arranged within a casing the bottom of which is sloped toward the water outlet. Attached to said paddle is at least one small chain, which when the former is rotated has the effect of beating the alimentary product more completely than would be done by the paddle alone, said chain being adapted to act on the substance in the corners of the vessel. The cover of the vessel is provided with an opening to allow the emptying or filling of the alimentary product from or into the vessel without the cover having to be removed. Said opening is also intended for a funnel so as to allow the introduction of additional liquid into the vessel if required, during the working of the device. Said liquid may be contained in a reservoir mounted upon the device and communicating with the funnel. The sides of the vessel in which the beating or stirring of the alimentary product is effected may be cooled if desired by the waste water issuing from the discharge pipe of the hydraulic motor which may be discharged against the sides of the vessel.

The accompanying drawing shows by way of example one way of carrying out the present invention.

Figure 1:
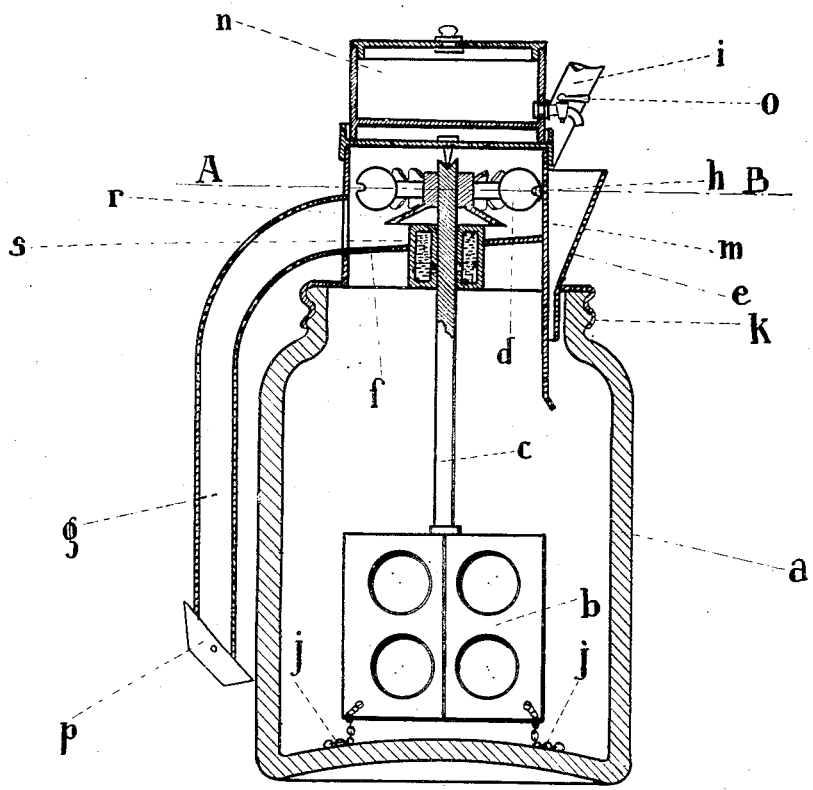
Figure 1 is a sectional side elevation.
Figure 2:
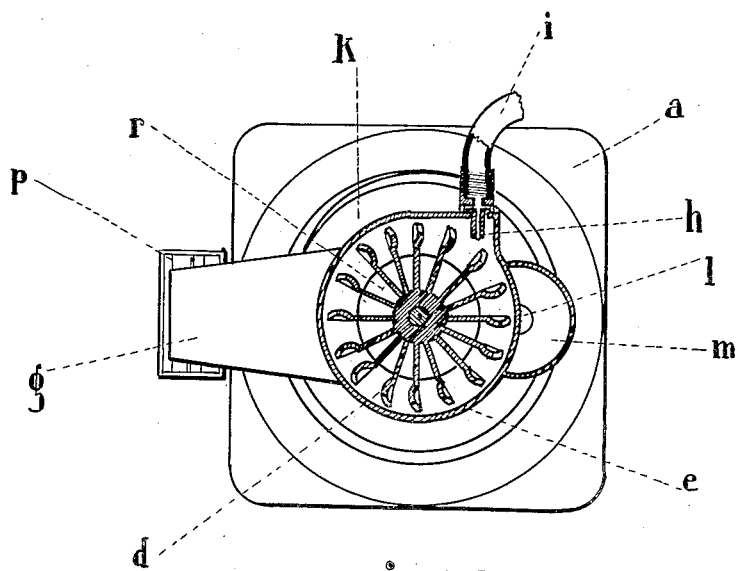
Fig. 2 is a plan taken on the sectional line A—B of Fig. 1.

The vessel $a$ is intended to take up the alimentary product which has to be beaten or stirred. Inserted into said vessel is the paddle $b$ fixed to the spindle $c$, which latter is driven by a hydraulic motor consisting of a turbine $d$ with vertical spindle arranged in a casing $e$ the bottom $f$ of which is sloped toward the water discharge outlet $g$. The turbine $d$ is actuated by water issuing from a nozzle $h$ which may be connected to a water pipe (not shown in the drawing) by means of a rubber tube $i$.

Attached to the paddle $b$ is at least one small chain $j$ which when the paddle is rotated has the effect to stir the alimentary product more completely than would be done by the paddle alone, said chain being adapted to act on the substance even in the corners of the vessel. The cover $k$ of the vessel is provided with an opening $l$ which allows the removal of the alimentary product contained in the vessel $a$ without the cover $k$ having to be removed.

The opening $l$ is also intended for a funnel $m$ for allowing the introduction into the vessel $a$ of additional liquid if required during the working of the device. Said liquid being contained in a reservoir $n$ and can be introduced into the funnel $m$ by the cock $o$.

The sides of the vessel $a$ in which the beating or stirring of the alimentary product is effected, may be cooled if required by the waste water issuing from the discharge pipe $g$ which may be discharged against the sides of the vessel $a$ by means of a small vessel or receiver $p$ adapted to pivot around the end of the discharge pipe $g$.

Under the turbine is the hat $r$ fixed thereto and intended to protect the bearing of the spindle $c$ and to prevent the water from going into the vessel $a$.

Having thus described our invention, what we claim is:

In a mixer, a container, a detachable cover therefor, a casing on said cover, a revoluble stirrer having a shaft mounted in said casing and provided with a water wheel also arranged in said casing, means to discharge water against said water wheel in said casing, a water discharge conduit leading downwardly from said casing, and a deflecting element pivoted to the lower end of said conduit and adapted to be arranged to cause water from the conduit to be directed against the exterior of the container to cool the same.

In testimony whereof we affix our signatures in presence of two witnesses.

HENRY S. WALTHER.
GUSTAVE HENCHOZ.

Witnesses:
HENRI CHAPMINES,
LOUIS H. MUNIER.